UNITED STATES PATENT OFFICE.

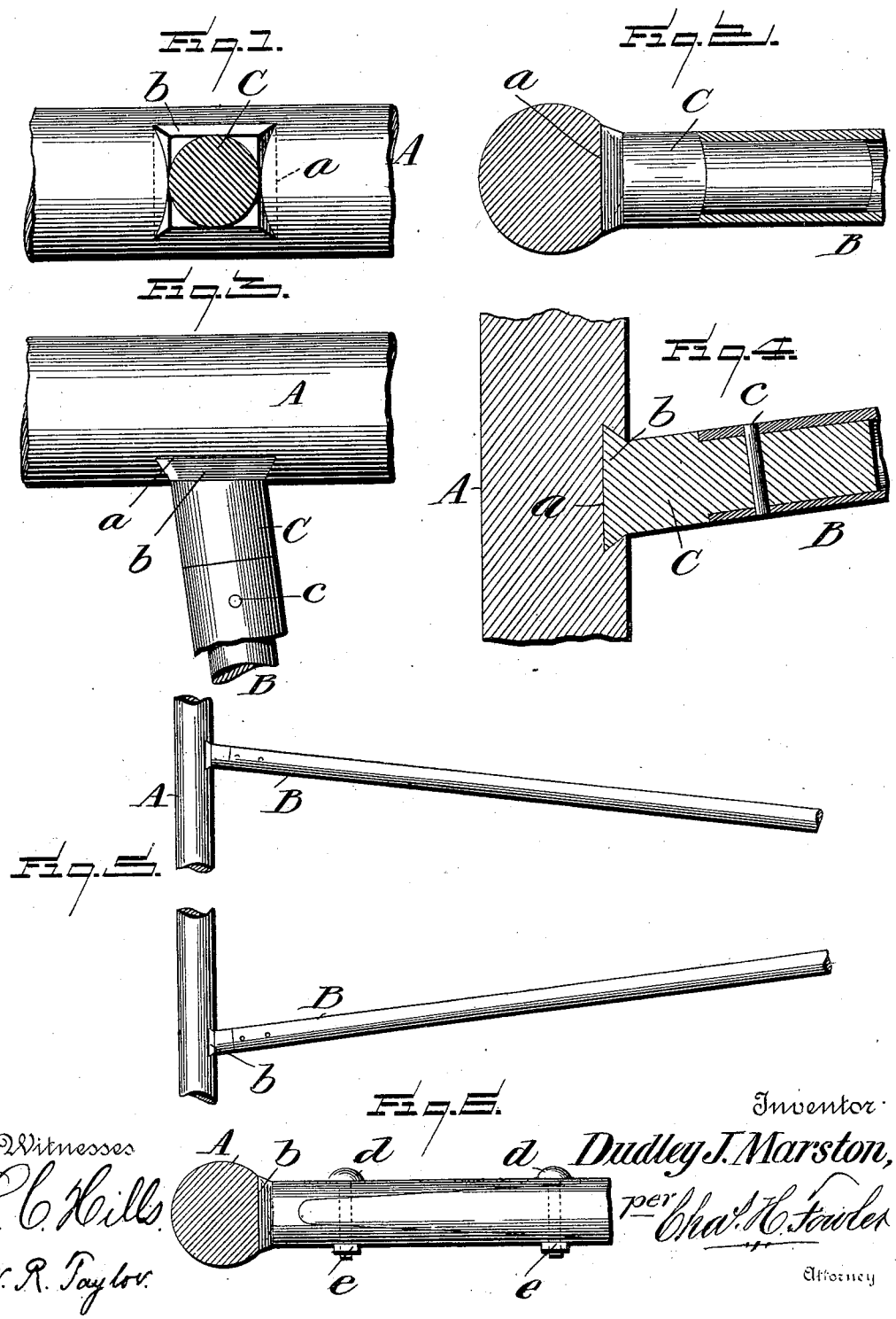

DUDLEY JEFFERSON MARSTON, OF AMESBURY, MASSACHUSETTS, ASSIGNOR OF ONE-HALF TO THE AMESBURY PNEUMATIC GEAR COMPANY, OF SAME PLACE.

VEHICLE-REACH COUPLING.

SPECIFICATION forming part of Letters Patent No. 645,530, dated March 13, 1900.

Application filed January 6, 1900. Serial No. 609. (No model.)

*To all whom it may concern:*

Be it known that I, DUDLEY JEFFERSON MARSTON, a citizen of the United States, residing at Amesbury, in the county of Essex and State of Massachusetts, have invented certain new and useful Improvements in Vehicle-Reach Couplings; and I do hereby declare that the following is a full, clear, and exact description of the same, reference being had to the annexed drawings, making a part of this specification, and to the letters of reference marked thereon.

The present invention has relation to the reaches for buggies and other vehicles, and the object thereof is to provide a simple, strong, and durable coupling at the rear or back end of the reach with the axle of the vehicle; and the invention consists in a coupling constructed substantially as shown in the drawings and hereinafter described and claimed.

Figure 1 of the drawings is a front view of a portion of the rear axle of a vehicle, showing the manner of coupling the reach thereto, the coupling end of the reach being in section. Fig. 2 is an elevation, partly in section, showing the reach and axle; Fig. 3, a plan view showing the axle and coupling; Fig. 4, a horizontal section thereof; Fig. 5, a plan view, on a reduced scale, showing the axle in broken section and the two reaches connected thereto by my improved coupling; Fig. 6, a modification in the manner of connecting the coupling-shank to the end of the reach.

In the accompanying drawings, A represents the rear axle of a buggy or other vehicle, and B the reach, of any desirable construction, but preferably tubular, as shown. The axle A, which may also be of any preferred construction, either round or other form, has a dovetail mortise $a$, into which fits a dovetail head $b$, formed upon the end of a shank C, which shank is suitably connected to the end of a tubular or other form of reach B by entering the tubular end of the reach and secured thereto by pins $c$ or other suitable fastenings, as shown in Figs. 3 and 4 of the drawings, or the shank may be formed as indicated in Fig. 6 of the drawings and secured by bolts $d$ and nuts $e$.

I do not wish to be understood as confining my invention to any special means of connecting the shank to the reach, as this may be variously modified or changed, as found most desirable, without effecting the principle of the invention.

The axle A is preferably of steel and designed to be used without a wood bed, known usually as "naked axle," and the shank C, with its dovetail head $b$, is constructed, preferably, of steel or iron. This dovetail mortise $a$ and dovetail head $b$ are made to nicely fit each other, and when the head is driven in the mortise it will fit tightly, and afterward the whole is brazed together, as is also the reach with the shank. The reach may be of any preferred form and construction and either tubular or solid and of metal or wood, as found desirable.

Having now fully described my invention, what I claim as new, and desire to secure by Letters Patent, is—

1. A coupling for vehicle-reaches, consisting of a dovetail mortise and a dovetail head fitting therein, substantially as and for the purpose set forth.

2. In a vehicle-reach coupling, a suitable axle having a dovetail mortise, and a reach and a shank suitably connected thereto, said shank having a dovetail head adapted to fit in the dovetail mortise in the axle, substantially as and for the purpose described.

3. In a vehicle-reach coupling, a suitable axle having a dovetail mortise, a tubular reach, and a shank fitting therein and secured thereto, said shank having a mortise-head adapted to fit the mortise in the axle, substantially as and for the purpose specified.

In testimony that I claim the above I have hereunto subscribed my name in the presence of two witnesses.

DUDLEY JEFFERSON MARSTON.

Witnesses:
ANNIE M. WALLACE,
EDWARD P. WALLACE.